(12) United States Patent
Mayhew et al.

(10) Patent No.: US 7,953,024 B2
(45) Date of Patent: May 31, 2011

(54) FAST CREDIT SYSTEM

(75) Inventors: David Mayhew, Northborough, MA (US); Nathan Dohm, Natick, MA (US)

(73) Assignee: Jinsalas Solutions, LLC, Dover, DE (US)

( * ) Notice: Subject to any disclaimer, the term of this patent is extended or adjusted under 35 U.S.C. 154(b) by 94 days.

(21) Appl. No.: 12/422,909

(22) Filed: Apr. 13, 2009

(65) Prior Publication Data
US 2010/0097933 A1    Apr. 22, 2010

Related U.S. Application Data

(63) Continuation of application No. 10/942,203, filed on Sep. 16, 2004, now Pat. No. 7,518,996.

(51) Int. Cl.
*H04J 1/16* (2006.01)
*H04L 12/28* (2006.01)

(52) U.S. Cl. .......................... 370/252; 370/410; 370/412

(58) Field of Classification Search .................. 370/252, 370/410, 412
See application file for complete search history.

(56) References Cited

U.S. PATENT DOCUMENTS

| | | | |
|---|---|---|---|
| 5,633,867 A | 5/1997 | Ben-Nun et al. | |
| 5,793,747 A | 8/1998 | Kline | |
| 5,995,486 A * | 11/1999 | Iliadis | 370/229 |
| 6,282,589 B1 * | 8/2001 | Porterfield et al. | 710/52 |
| 6,424,622 B1 | 7/2002 | Fan et al. | |
| 6,615,271 B1 | 9/2003 | Lauck et al. | |
| 6,658,004 B1 * | 12/2003 | Kadansky et al. | 370/394 |
| 6,934,250 B1 | 8/2005 | Kejriwal et al. | |
| 7,150,021 B1 | 12/2006 | Vajjhala | |
| 7,272,149 B2 | 9/2007 | Bly et al. | |
| 7,518,996 B2 * | 4/2009 | Mayhew et al. | 370/236 |
| 7,620,693 B1 * | 11/2009 | Mott et al. | 709/213 |
| 7,636,358 B1 * | 12/2009 | Manchester et al. | 370/394 |
| 2003/0223442 A1 * | 12/2003 | Huang et al. | 370/412 |
| 2005/0018609 A1 | 1/2005 | Dally et al. | |
| 2005/0073956 A1 | 4/2005 | Moores et al. | |
| 2005/0163141 A1 * | 7/2005 | Katayama | 370/412 |
| 2006/0159019 A1 | 7/2006 | Buskirk et al. | |
| 2008/0037428 A1 * | 2/2008 | Nation et al. | 370/235 |

* cited by examiner

*Primary Examiner* — Andrew Lee

(57) ABSTRACT

The invention provides an improved architecture for credit based flow control. Briefly, the memory space within the receiving switch is separated into two parts, a statically allocated portion and a dynamically allocated portion. Packets are first placed in the dynamically allocated portion, and the credits are returned immediately. When the dynamically allocated portion has no additional space, the packets are then stored in the memory portion statically allocated to the specific virtual circuit. Credits are returned when the packets are removed from the statically allocated memory portion. This scenario allows the immediate return of credits when there is space available in the dynamically allocated memory portion. It also allows improved sharing of the overall memory since more of the overall memory can be made available to a particular virtual circuit.

28 Claims, 2 Drawing Sheets

FAST CREDIT SYSTEM

The present application is a continuation of U.S. application Ser. No. 10/942,203, filed Sep. 16, 2004 now U.S. Pat. No. 7,518,996, which is incorporated by reference in the present application in its entirety.

BACKGROUND OF THE INVENTION

In computer networks, information is constantly being moved from a source to a destination, typically in the form of packets. In the simplest situations, the source and destination are directly connected and the packet of information passes from the source to the destination, without any intermediate stages. However, in most networks, there is at least one, if not multiple, intermediate stages between the source and the destination. In order for the information to move from the source to the destination, it must be routed through a set of devices that accept the packet and pass it along a predetermined path toward the destination. These devices, referred to generically as switches, are typically configured to accept packets from some number of input ports and transmit that information to an output port, which was selected from a plurality of ports. Often, ports are capable of both receiving and transmitting, such that the input and output ports are the same physical entities.

In an ideal network, traffic arrives at an input port of a switch. The switch determines the appropriate destination for the packet and immediately transmits it to the correct output port. In such a network, there is no need for storing the packet of information inside the switch, since the switch is able to transmit the packet as soon as it receives it.

However, because of a number of factors, this ideal behavior is not realizable. For instance, if the switch receives packets on several of its input ports destined for the same output port, the switch must store the information internally, since it cannot transmit all of these different packets of information simultaneously to the same output port. In this case, the output port is said to be "congested". This term also describes the situation in which the device to which this output port is connected is unable to receive or process packets at the rate at which they arrive for some reason. In such a case, the switch must store the packet destined for that output port internally until either the offending device is able to receive more information or the packet is discarded.

In response to this phenomenon, many networks employ a mechanism known as flow control, in which the various switches and devices in the network communicate status information with each other. In this way, it is possible to proactively detect that a switch is becoming congested and take appropriate actions. For example, if a switch is congested and no longer has space in which to store additional packets, it may communicate this information to neighboring switches. These switches then stop transmitting packets to the congested node until the congested node has space to accept the packets, so as to insure that no packets are lost. There are a number of different flow control mechanisms. One such mechanism that is employed is known as credit-based flow control.

The term "credit" is typically used to denote an amount of storage, such as 32 or 64 bytes, that is available within the receiving device. During initialization, each switch communicates to its neighboring switches the amount of internal storage space it has available for incoming packets from that switch. This amount is communicated as the number of credits that it has available to the sender. The neighboring switch records this value, and uses it to control its transmissions to that switch.

When the transmitting switch sends a packet to another switch, it decrements the number of credits that it has associated with that switch based on the size of the packet. If the packet is large, the number of credits will be reduced accordingly. As the number of available credits approaches zero, the sender stops transmission to that switch, knowing that the receiving switch will be unable to store the packets.

Meanwhile, as the receiving switch processes these packets and removes them from its memory, it "returns" the credits back to the sending switch via a flow control message. This message informs the sending switch to increment the number of credits that are available at the receiving switch, typically by the number given in the flow control message.

In this way, the sending switch never sends packets that the receiving switch is unable to store. Typically, this type of flow control is used to control communications that are part of a virtual circuit. A virtual circuit is a logical connection between two points which is assumed to be a perfect, lossless, sequenced path of communications. Therefore, it is unacceptable that a packet be lost because the receiving switch did not have sufficient space in which to store the incoming packet.

Typically, within each switch there is a memory element, or a portion of a memory element which is statically allocated to each particular virtual circuit. The amount of space allocated in a memory element to a particular virtual circuit determines the number of credits which that receiving switch has with respect to that virtual circuit.

While the static allocation of a memory element or a portion of a memory element does insure that the flow control credit mechanism operates correctly, it is not without its drawbacks. Specifically, due to the static allocation of memory between the various virtual circuits, there could be scenarios in which one virtual circuit is starved for credits, while another is completely idle. Secondly, the credit scheme requires communication from the receiver back to the sender in order to replenish the sender's credit. If the credits are not returned in a timely manner, the overall bandwidth of the network can suffer, since the sender may be waiting to receive credits before transmitting. These delays can cause congestion in the sending switch, and the congestion can spread to other parts of the network.

SUMMARY OF THE INVENTION

The problems with the prior art have been overcome with this invention, which provides an improved architecture for credit based flow control. Briefly, the memory space within the receiving switch is separated into two parts, a statically allocated portion and a dynamically allocated portion. Packets are first placed in the dynamically allocated portion, and the credits are returned immediately. When the dynamically allocated portion has no additional space, the packets are then stored in the memory portion statically allocated to the specific virtual circuit. Credits are returned when the packets are removed from the statically allocated memory portion. This scenario allows the immediate return of credits when there is space available in the dynamically allocated memory portion. It also allows improved sharing of the overall memory since more of the overall memory can be made available to a particular virtual circuit.

DETAILED DESCRIPTION OF THE INVENTION

Figure 1:
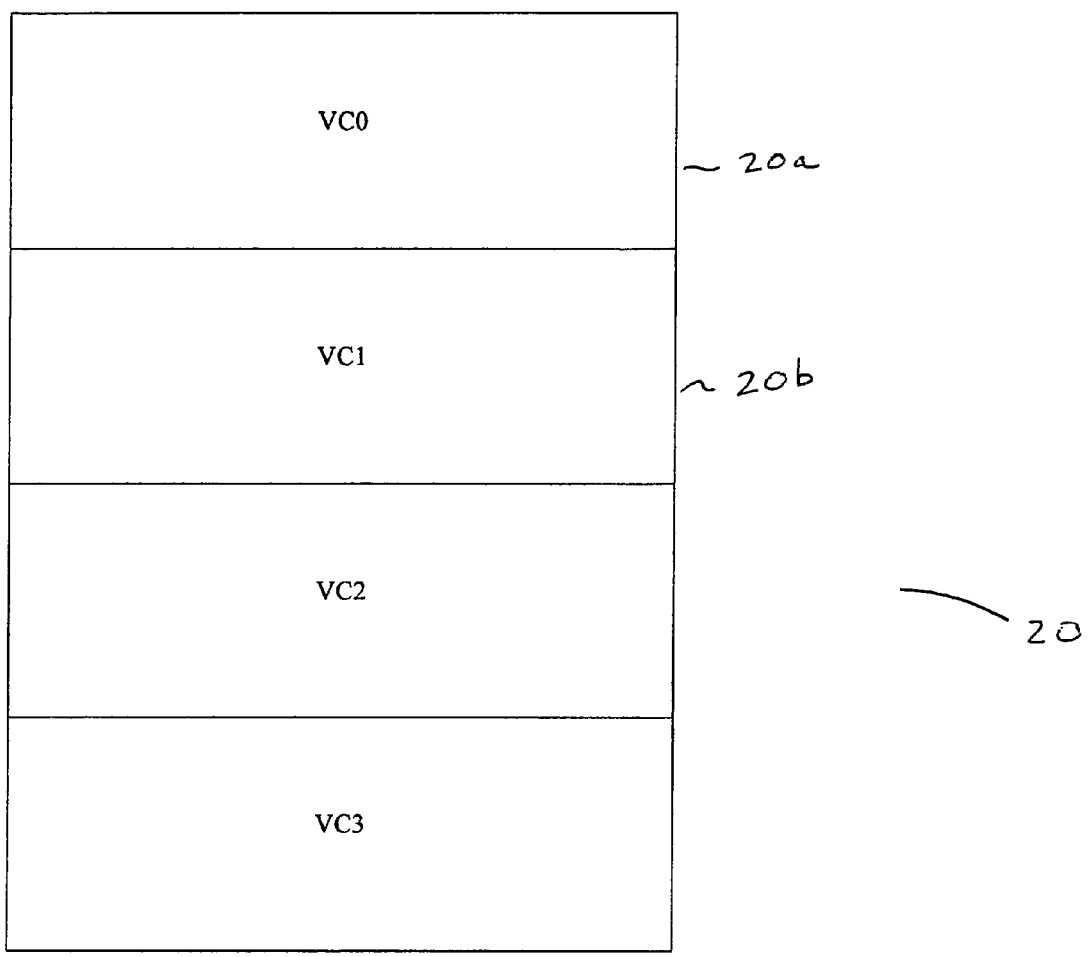
FIG. 1 illustrates a typical architecture for a credit-based flow control switch of the prior art.

FIG. 1 shows the typical architecture used to implement a credit-based flow control switch. Packets arrive via a plurality of input ports (not shown). A determination of whether they are associated with a virtual circuit is made. A virtual circuit denotes a specific set of communications between two devices. A virtual circuit can be based on the path, the traffic class, a unique flow ID or other markings embedded in the packet, or a combination of these. If the packet is part of a virtual circuit, it is placed in the memory element 20 associated with that virtual circuit. For example, packets that are part of virtual circuit 0 (VC0) are placed in memory element 20a, while packets that are part of VC1 are placed in memory element 20b. The switch tracks the location and sequence of these incoming packets using a mechanism, such as but not limited to linked lists. Using a linked list, the location of each new packet is added to the end of the list. At a later time, the packet is removed from the memory element 20 and either processed or transmitted to the next destination. As packets are removed from the memory element, their entries are removed from the head of the list. Once the packet is removed from its respective memory element 20, a flow control message is created and returned to the switch from which that packet arrived, informing that switch to replenish the credits it has associated with this switch by a specified amount.

In this way, the sender never transmits packets that the receiving node cannot accept. The sender decrements its credit count immediately upon transmission. This count is not incremented until the sender is explicitly instructed to do so by the receiving switch, when the receiving switch is guaranteed to have the required free space.

As described above, there are several drawbacks to this implementation. First, the credits are not returned to the sender until the receiving switch has removed them from memory element 20. This requires that there be a delay between the receipt of a packet and the return of the credits used by that packet to the sender. In systems operating with a limited number of credits, this delay could affect performance. For example, the sender may have multiple packets to transmit to a switch. If the number of credits it has is inadequate, the sender must wait until the receiving switch processes an earlier packet and returns the credits before it can send the next packet. If this persists, it will negatively affect the effective bandwidth between the sender and the receiver, since the path between the two is idle while the sender waits for returned credits.

A second drawback to this implementation is inefficient memory utilization. Assume in FIG. 1 that virtual circuit 0 (VC0) is transmitting a large number of packets. These packets are being stored in memory element 20a. Also assume that virtual circuit 1 (VC1) is inactive or has only a low level of activity, and therefore memory element 20b is, in effect, unused. Even though there is sufficient memory space (such as in memory element 20b) to store more packets from VC0, this space is unavailable as the memory has been statically allocated to VC1. For example, the traffic pattern from VC1 may be such that a smaller number of credits would be sufficient. Therefore, additional credits could have been used by VC0 without impacting the performance of VC1. Because memory element 20a is filled, the sending switch must stop transmitting packets to this switch, thereby impacting the performance of the network, even though there is free memory space in the congested switch. A second manifestation of poor memory utilization is as follows. Assume that the output port associated with VC0 is unable to transmit for some reason, while the other output ports are all lightly loaded. Once the statically allocated memory space is filled, this switch will receive no more packets from the sending switch, even though there is sufficient space in other memory elements to store additional packets without affecting the other virtual circuit. As in the situation above, this will spread the congestion to the sending switch. These situations can be overcome by increasing the amount of buffering for each VC, but this could result in a significant increase of total RAM, and therefore component cost and power dissipation.

Figure 2:
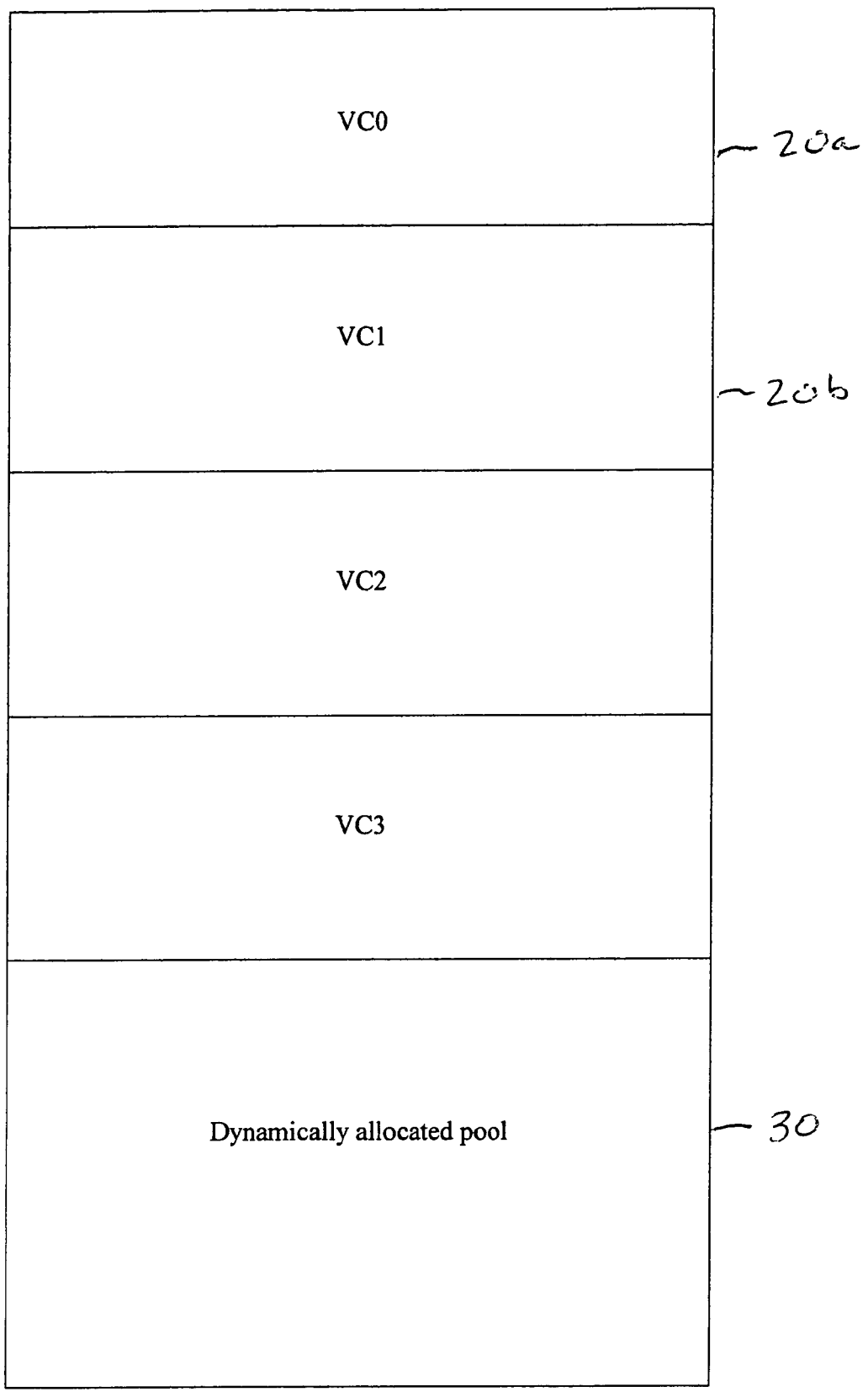
FIG. 2 illustrates the architecture for the credit-based flow control switch of the present invention.

FIG. 2 illustrates the architecture of a credit-based flow control switch in accordance with the present invention. As existed in the prior art, there is a number of memory elements 20, which are each statically allocated to a particular virtual circuit. In FIG. 2, memory element 20a is allocated to VC0, while memory element 20b is allocated to VC1, and so on. In addition to these statically allocated memory elements, there is a dynamically allocated memory element 30. This dynamically allocated memory element 30 is not assigned to a particular VC, rather it is adapted to store packets associated with a plurality of virtual circuits. In this example, each statically allocated memory element can store 50 credits while the dynamically allocated memory element can store 100 credits. This configuration is for illustrative purposes only and is not meant to so limit the invention.

In the preferred embodiment, as packets arrive, the switch determines first if there is free space in the dynamically allocated memory element, as this is the preferred destination. If there is space available in the dynamically allocated pool, the packet is stored there. As in the prior art, an entry for the new packet is added to the end of a linked list associated with the particular VC. Since the statically allocated memory element was not used, the switch is still capable of storing 50 credits, which is the number of credits that it communicated to the sender during initialization. Therefore, the credits associated with this received message can be returned immediately to the sender, even though the packet may still reside in the dynamically allocated memory element. The control logic in the switch creates and transmits a flow control message, allowing the sender to replenish the credits used to send the packet. Because of this feature, the dynamically allocated memory element 30 is also referred to as the fast credit pool.

The switch tracks the packets associated with a VC using a mechanism, such as a linked list or a FIFO (First In-First Out). As packets arrive and are stored in either the fast credit pool or in the statically allocated memory element, they are added to the tail of the linked list or FIFO. When the packet reaches the head of the list, it is processed or transmitted by the control logic in the switch. If the packet had been in the fast credit pool, it is simply transmitted. If the packet had been in one of the statically allocated memory elements 20, then, in addition to transmitting the packet, the control logic in the switch sends a message back to the sender replenishing the credits used by this packet. The determination as to which memory element the packet was stored in can be done in a number of ways, such as using the address of the packet to determine its location, or preferably by using a marker or tag in the list entry to denote the location of the packet.

By using both a statically allocated and dynamically allocated memory element to store packets, the switch retains the advantages of the prior art, while overcoming its drawbacks. Specifically, each VC is still given a guaranteed number of credits. Therefore, traffic for that VC will still be lossless, as in the prior art. However, this switch offers several advantages over the prior art.

First, as described above, the switch has the ability to return credits immediately if the incoming packet is stored in the dynamically allocated memory element. This can improve overall network performance, since the processing within the switch does not impact the return of credits to the sender.

A second advantage is the improved memory utilization. Suppose that in the FIG. 1, each of the four memory elements is capable of holding 75 credits. In FIG. 2, each of the statically allocated memory elements is capable of holding 50 credits, and the dynamically allocated memory element can hold an additional 100 credits. In both examples, the total number of credits, for all VCs, that the switch can store is 300. However, in the case where one VC is sending a significant amount of packets or experiences downstream congestion, the architecture in FIG. 2 is able to use up to 150 credits to store packets from that particular VC. In contract, the architect of FIG. 1 can only hold 75 credits for any VC, regardless of traffic patterns. In this way, the combination of both static and dynamically allocated memory elements is better able to adapt to various network conditions.

As the dynamically allocated memory element becomes a larger percentage of the overall memory, the memory utilization increases. That is, a statically allocated memory elements can remain unused for a particular traffic pattern, while a dynamically allocated memory is always available. However, a switch that contains only dynamically allocated memory can be ineffective. Since all of the memory is pooled among multiple VCs, the receiver is unable to advertise any credits, since these credits represent a guarantee that the receiver has space to store a packet for a particular VC. Therefore, the sender is unable to send any packets, since there are no outstanding credits. Likewise, if the statically allocated memory element is too small, the sender may still use up its allocation of credits before the packets have been received, placed in the fast credit pool, and a credit message returned. This sets a lower bound on the amount of credit that must be advertised, and therefore the size of the statically allocated memory element.

What is claimed is:

1. A first switching device, comprising:
    a plurality of memory portions, one or more of which is dedicated to storing data packets received at the first switching device via a respective one of a plurality of communication paths; and
    a common memory portion including a plurality of storage locations, wherein one or more of the plurality of storage locations is configured to store data packets received via any of the plurality of communication paths;
    wherein, prior to receiving one or more data packets from a second switching device via a given one of the plurality of communication paths, the first switching device is configured to:
        provide information to the second switching device indicative of a first amount of available storage for storing data packets, wherein the first amount of available storage represents an amount of available storage in the common memory portion and an amount of available storage in the memory portion that is dedicated to the given one of the plurality of communication paths; and
    wherein, in response to receiving the one or more data packets via the given one of the plurality of communication paths, the first switching device is further configured to:
        in response to determining that at least one of the plurality of storage locations is available to store the received one or more data packets, store the received one or more data packets for re-transmission in an available one of the plurality of storage locations; and
        in response to determining that none of the plurality of storage locations is available to store the received one or more data packets, store the received one or more data packets for re-transmission in a memory portion of the plurality of memory portions that is dedicated to the given one of the plurality of communication paths.

2. The first switching device of claim 1, wherein the first switching device is further configured to provide information indicative of a second amount of available storage to the second switching device upon storing the received one or more data packets in the available one of the plurality of storage locations.

3. The first switching device of claim 1, wherein the first switching device is further configured to provide information indicative of a second amount of available storage to the second switching device upon re-transmission of the received the one or more data packets, if the received one or more data packets are stored in one of the plurality of memory portions.

4. The first switching device of claim 1, wherein the first switching device is further configured to store an ordering in which the one or more data packets are received at the first switching device and a respective storage location for one or more of the received one or more data packets.

5. The first switching device of claim 1, wherein one or more of the plurality of memory portions has a storage capacity that is less than a storage capacity of the common memory portion.

6. A method, comprising:
    providing, from a first switching device to a second switching device, information indicative of a first amount of available storage for storing data packets, wherein the first switching device includes:
        a plurality of groups of memory locations, wherein the memory locations of one or more of the plurality of groups is dedicated to storing data packets received via a respective one of a plurality of communication paths; and
        a common memory group including a plurality of storage locations, one or more of which is usable to store data packets received via any of the plurality of communication paths;
    wherein the first amount of available storage includes an amount of available storage in the common memory group and an amount of available storage in one of the plurality of groups of memory locations;
    subsequently to providing said information, receiving a first set of one or more data packets at the first switching device via a first of the plurality of communication paths;
    in response to determining that at least one of the plurality of storage locations is available to store the received first set of one or more data packets, storing the received first set of one or more data packets in an available one of the plurality of storage locations; and
    transmitting the first set of one or more data packets.

7. The method of claim 6, further comprising:
    providing information indicative of a second amount of available storage from the first switching device to the second switching device prior to said transmitting.

8. The method of claim 6, further comprising:
    receiving a second set of one or more data packets at the first switching device via a second of the plurality of communication paths; and in response to determining that none of the plurality of storage locations is available to store the received second set of one or more data packets, storing the received second set of one or more data packets in a memory location in a first group of the plurality of groups, wherein the first group is dedicated to the second communication path.

9. The method of claim 6, wherein one or more of the plurality of groups of memory locations has a storage capacity that is less than a storage capacity of the common memory group.

10. A method, comprising:
providing, from a first switching device to a second switching device, information indicative of a first amount of available storage for storing data packets received via a first communication path, wherein the first switching device includes:
a plurality of groups of memory locations, one or more of which is dedicated to storing data packets received via a respective one of a plurality of communication paths; and
a common memory group including a plurality of storage locations, one or more of which is usable to store data packets received via any of the plurality of communication paths;
wherein the first amount of available storage includes an amount of available storage in the common memory group and an amount of available storage in one of the plurality of groups of memory locations that is dedicated to the first communication path;
receiving a first set of one or more data packets at the first switching device via the first communication path;
in response to determining that none of the plurality of storage locations is available to store the received first set of one or more data packets, storing the received first set of one or more data packets in a memory location in a first group of the plurality of groups, wherein the first group is dedicated to storing data packets received via the first communication path; and
transmitting the first set of one or more data packets.

11. The method of claim 10, further comprising:
providing information indicative of a second amount of available storage from the first switching device to the second switching device upon said transmitting.

12. The method of claim 10, further comprising:
receiving a second set of one or more data packets at the first switching device via a second of the plurality of communication paths; and
in response to determining that at least one of the plurality of storage locations is available to store the received second set of one or more data packets, the first switching device storing the received second set data packets in the at least one available storage location.

13. The method of claim 10, wherein one or more of the plurality of groups of memory locations has a storage capacity that is less than a storage capacity of the common memory group.

14. A method comprising:
a first switching device receiving a value indicative of an amount of storage capacity available to store data packets at a second switching device, wherein the second switching device includes: a plurality of memory portions, each of which includes a plurality of storage locations and is dedicated to storing data packets received via a respective one of a plurality of communication paths, and a common memory portion including a plurality of storage locations, each of which is configured to store data packets received via any of the plurality of communication paths;
the first switching device sending a first set of one or more data packets to the second switching device;
the first switching device adjusting the value to indicate said sending of said first one or more data packets; and
the first switching device receiving a first set of information from the second switching device in response to the first set of one or more data packets being stored in the common memory portion of the second switching device;
wherein the first set of information is received prior to re-transmission of the first set of one or more data packets by the second switching device, and wherein the first set of information indicates to the first switching device that the value should be adjusted to reflect an additional amount of storage capacity being available at the second switching device.

15. The method of claim 14, further comprising:
the first switching device sending a second set of one or more data packets to the second switching device; and
the first switching device receiving a second set of information from the second switching device in response to the second switching device re-transmitting the second set of one or more data packets from one of the plurality of memory portions;
wherein the second set of information indicates to the first switching device that the value should be adjusted to reflect an additional amount of storage capacity being available at the second switching device.

16. The method of claim 14, wherein the value indicates a total number of storage locations that are available in the second switching device to store data packets from the first switching device, wherein the total number of storage locations include storage locations in the common memory portion and storage locations in one of the plurality of memory portions that corresponds to the first switching device.

17. The method of claim 14, wherein each of the plurality of memory portions has a storage capacity that is less than a storage capacity of the common memory portion.

18. A method, comprising:
receiving a first set of one or more data packets via a first of a plurality of communication paths at a first switching device, wherein the first switching device includes:
a plurality of groups of memory locations, wherein the memory locations of one or more of the plurality of groups is dedicated to storing data packets received via a respective one of the plurality of communication paths; and
a common memory group including a plurality of storage locations, one or more of which is usable to store data packets received via any of the plurality of communication paths;
in response to determining that at least one of the plurality of storage locations is available to store the received first set of one or more data packets, storing the received first set of one or more data packets in an available one of the plurality of storage locations;
transmitting the first set of one or more data packets;
receiving a second set of one or more data packets via a second of the plurality of communication paths; and
in response to determining that none of the plurality of storage locations is available to store the received second set of one or more data packets, storing the received second set of one or more data packets in a memory location in a first group of the plurality of groups, wherein the first group is dedicated to the second communication path.

19. The method of claim 18, wherein the first set of one or more data packets are received by the first switching device from a second switching device, wherein the method further comprises:
prior to the first switching device receiving the first set of one or more data packets from the second switching device, providing information to the second switching device indicative of a first amount of available storage for storing data packets received via the first communication path, wherein the first amount of available storage includes an amount of available storage in the common memory group and an amount of available storage in one of the plurality of groups of memory locations that is dedicated to the first communication path.

20. The method of claim 19, further comprising:
providing information indicative of a second amount of available storage to the second switching device prior to said transmitting.

21. The method of claim 18, wherein one or more of the plurality of groups of memory locations has a storage capacity that is less than a storage capacity of the common memory group.

22. A first switching device comprising:
a dedicated memory dedicated to storing data packets received at the first switching device from a given one of a plurality of switching devices;
a common memory configured to store data packets received from any of the plurality of switching devices; and
control logic configured to, in response to receiving one or more data packets from the given one of the plurality of switching devices and determining that the common memory is available to store the received one or more data packets, store the received one or more data packets in the common memory and provide information indicative of an amount of available storage to the given one of the plurality of switching devices prior to re-transmission of the received one or more data packets.

23. The first switching device of claim 22, wherein the control logic is further configured to, in response to determining that common memory is not available to store the received one or more data packets, store the received one or more data packets in the dedicated memory.

24. The first switching device of claim 22, wherein the control circuit, prior to the first switching device receiving the one or more data packets from the given one of the plurality of switching devices, is further configured to provide information to the given one of the plurality of switching devices indicative of an amount of available storage in the common memory and an amount of available storage in the dedicated memory.

25. The first switching device of claim 22, wherein one or more of the plurality of memory portions has a storage capacity that is less than a storage capacity of the common memory portion.

26. A method comprising:
receiving a data packet at a first switching device from a second switching device, wherein the first switching device includes a dedicated memory configured to store data packets received from the second switching device and a common memory configured to store data packets received from any switching device;
determining that the common memory is available to store the received data packet;
storing the received data packet in the common memory; and
providing information indicative of an amount of available storage to the second switching device prior to re-transmission of the received data packet.

27. The method of claim 26, further comprising:
providing information to the second switching device indicative of an amount of available storage in the common memory and an amount of available storage in the dedicated memory prior to receiving the data packet.

28. The method of claim 26, wherein providing information indicative of the amount of available storage to the second switching device prior to re-transmission of the received data packet includes providing information indicative of the amount of available storage to the second switching device upon receipt of the received data packet.

* * * * *

UNITED STATES PATENT AND TRADEMARK OFFICE
CERTIFICATE OF CORRECTION

| | | |
|---|---|---|
| PATENT NO. | : 7,953,024 B2 | Page 1 of 1 |
| APPLICATION NO. | : 12/422909 | |
| DATED | : May 31, 2011 | |
| INVENTOR(S) | : Mayhew et al. | |

It is certified that error appears in the above-identified patent and that said Letters Patent is hereby corrected as shown below:

Column 1, line 2, below "Title" insert -- CROSS-REFERENCE TO RELATED APPLICATION --.

Signed and Sealed this
Fourth Day of October, 2011

David J. Kappos
*Director of the United States Patent and Trademark Office*